(12) United States Patent
Wu

(10) Patent No.: US 6,928,405 B2
(45) Date of Patent: Aug. 9, 2005

(54) METHOD OF ADDING AUDIO DATA TO AN INFORMATION TITLE OF A DOCUMENT

(75) Inventor: Shen-Yu Wu, Taipei (TW)

(73) Assignee: Inventec Corporation, Taipei (TW)

( * ) Notice: Subject to any disclaimer, the term of this patent is extended or adjusted under 35 U.S.C. 154(b) by 685 days.

(21) Appl. No.: 09/945,662

(22) Filed: Sep. 5, 2001

(65) Prior Publication Data

US 2003/0046085 A1 Mar. 6, 2003

(51) Int. Cl.$^7$ ............................................. G10I 11/00
(52) U.S. Cl. ..................... 704/201; 704/270; 704/278; 725/87; 707/104
(58) Field of Search ................... 704/278, 258, 704/270, 275, 201; 386/96; 379/88.02; 725/87; 382/309; 360/92; 434/308; 707/104, 501; 705/26; 396/429

(56) References Cited

U.S. PATENT DOCUMENTS

| | | | | |
|---|---|---|---|---|
| 3,911,494 A | * | 10/1975 | Wilson et al. | 360/92 |
| 3,924,339 A | * | 12/1975 | Wilson et al. | 434/308 |
| 5,574,519 A | * | 11/1996 | Manico et al. | 396/429 |
| 5,661,787 A | * | 8/1997 | Pocock | 704/270 |
| 6,115,509 A | * | 9/2000 | Yeskel | 382/309 |
| 6,351,679 B1 | * | 2/2002 | Ainslie | 704/275 |
| 6,400,806 B1 | * | 6/2002 | Uppaluru | 379/88.02 |
| 2001/0017975 A1 | * | 8/2001 | Ando et al. | 386/96 |
| 2002/0013784 A1 | * | 1/2002 | Swanson | 707/104.1 |
| 2002/0056123 A1 | * | 5/2002 | Liwerant et al. | 725/87 |
| 2002/0069218 A1 | * | 6/2002 | Sull et al. | 707/501.1 |
| 2002/0198789 A1 | * | 12/2002 | Waldman | 705/26 |

FOREIGN PATENT DOCUMENTS

| | | | | |
|---|---|---|---|---|
| JP | 58-037738 | * | 3/1983 | G06F/3/16 |
| JP | 09-098374 | * | 4/1997 | H04N/5/91 |
| JP | 11-331104 | * | 11/1999 | H04H/1/00 |
| JP | 2001-103402 | * | 4/2001 | H04N/5/76 |

OTHER PUBLICATIONS

PlanIt™ ("The Personal Daily PlanIt™ User's Guide", © 1992–93 Iguana Productions) excerpted.*
WordWeb™ (WordNet © 2001 Princeton University; Anthony Lewis @ 2002) definition for hyperlink.*

* cited by examiner

Primary Examiner—Vijay Chawan
(74) Attorney, Agent, or Firm—Birch, Stewart, Kolasch & Birch, LLP

(57) ABSTRACT

The invention relates to a method for adding an information title containing audio data to a document. It provides a method for rapidly adding audio data to those data stored in a computer (PC or laptop) or PDA (Personal Data Assistant). The invention allows audio data to be recorded by an audio recorder and saved as an audio file after the information title of a document is opened. A link between the opened information title and the audio file is created, and an audio link tag is then shown on the information title linked with the audio data. The audio data can be easily retrieved by clicking the information title.

10 Claims, 3 Drawing Sheets

METHOD OF ADDING AUDIO DATA TO AN INFORMATION TITLE OF A DOCUMENT

BACKGROUND OF THE INVENTION

1. Field of the Invention

The invention relates to a process of rapidly recording audio data to a computer (PC or laptop) or a Personal Digital Assistant (PDA), especially for rapidly adding recorded audio data to a designated text or other kind of information title.

2. Related Art

The most popular way to record audio data is by using an audio tape recorder or other audio recording instrument. The purpose of the recorded audio data is reference or for documents that could be printed papers 'manuscripts ' or digital data stored in a computer (PC or laptop) or Personal Digital Assistant (PDA). Computers and PDAs are widely used as substitutes for conventional notebooks for handling or storing information. The information could be text files 'pictures ' or movies. When a user is trying to retrieve audio data from an audio tape recorder, it is not easy to retrieve the data corresponding to document content from recorded audio data. The efficiency of obtaining information is thus not ideal.

Although audio files can be saved and played in most computers (PC or laptop) or PDAs, conventional methods of storing audio files using file management applications, such as Windows' File Manager, will save the audio file to an assigned disk or document folder. However, this is only a method for storing information to a disk or document folder. When users are trying to refer data to a corresponding audio file, it is still necessary to search for the corresponding file and then play the audio file with media player. In this case, it is not convenient at all.

SUMMARY OF THE INVENTION

A primary object of the invention is to provide a method of rapidly recording audio data to a computer (PC or laptop) or Personal Digital Assistant (PDA).

A second object of the invention is to provide a convenient method of recording audio data with a computer or PDA.

By using the method of the invention, users can designate an object (which could be a sentence or a title) that is linked to an audio file, run a recording program to save the recorded audio data as an audio file, and link the audio file to the designated object. After linking the object and audio file, an audio link tag is displayed on the object, enabling users to retrieve the audio file by simply clicking the information title.

Further scope of applicability of the invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will become more fully understood from the detailed description given hereinbelow. However, the following description is for purposes of illustration only, and thus is not limitative of the invention, wherein.

DETAILED DESCRIPTION OF THE INVENTION

Figure 1:
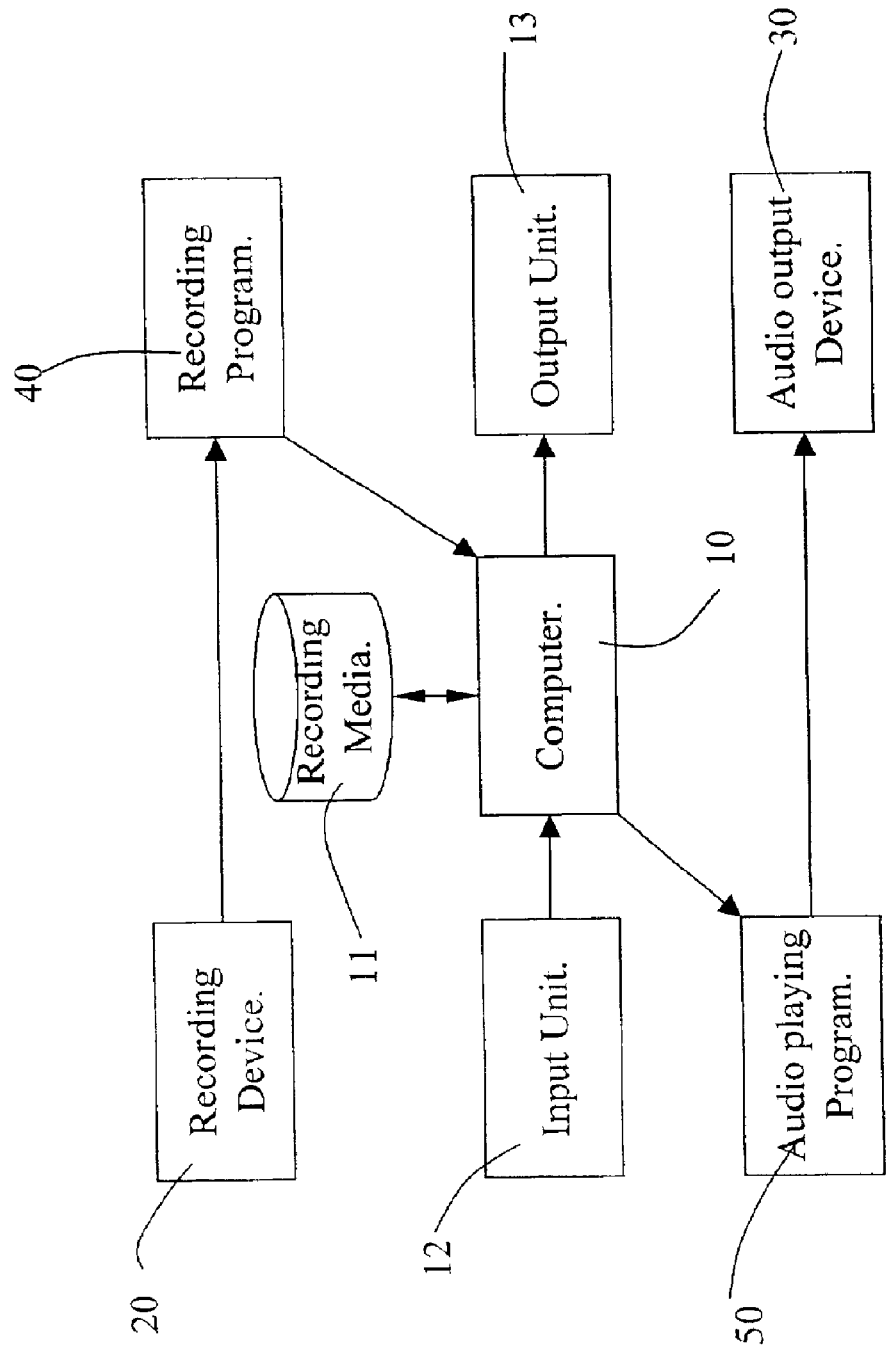
FIG. 1 illustrates the block diagram of the system function of the invention.

FIG. 1 illustrates the block diagram of the system function of the invention. The components required for the invention include:

- a computer 10, such as a PC 'laptop ' or PDA is required. The computer 10 comprises a device having multimedia functions. The multimedia functions are, for example, a recording media 11 from which data can be retrieved (such as a hard drive and memory) an input unit 12 (such as a mouse or keyboard) and an output unit 13 (such as a monitor);
- a recording device 20 (such as a microphone and audio card);
- an audio output device 30 (such as a headset and speaker);
- a recording program 40 and
- an audio playing program 50.

Figure 2:
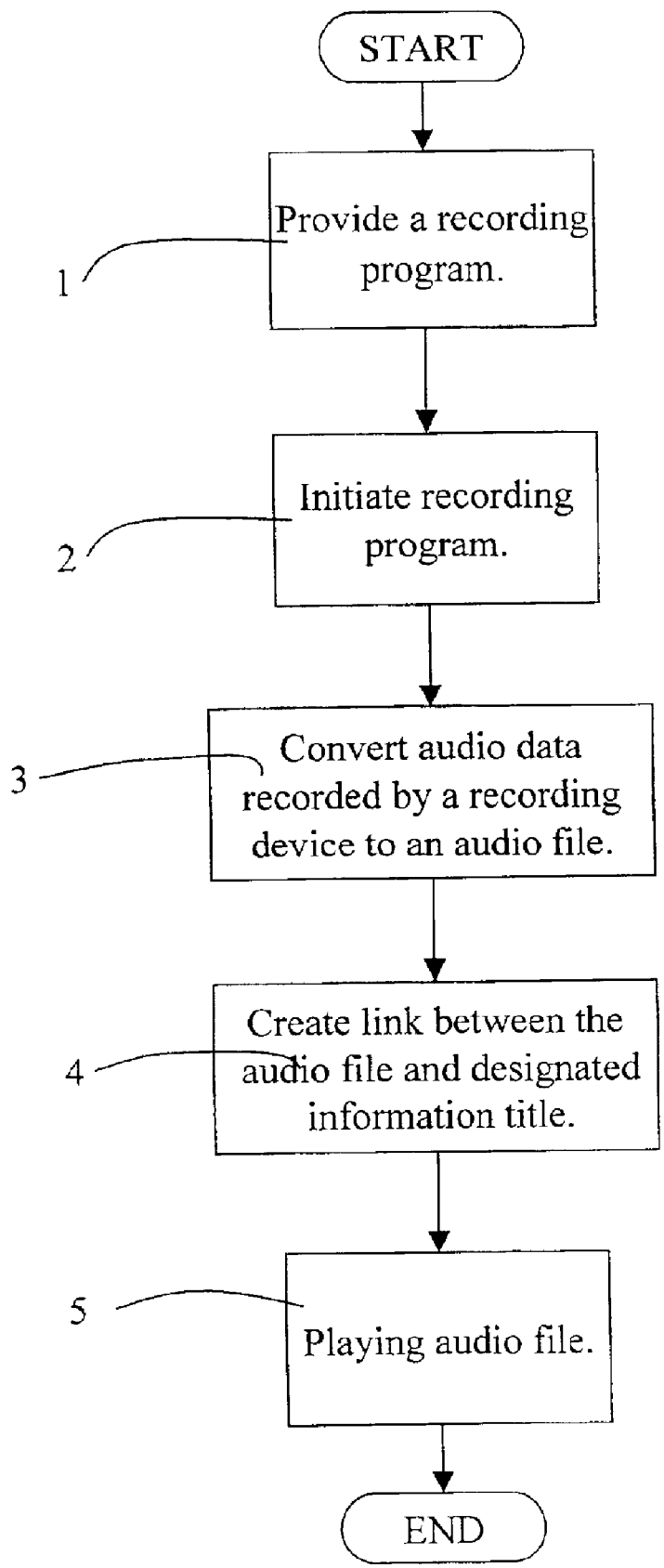
FIG. 2 illustrates the major operation flow chart of the invention.

FIG. 2 illustrates the major operation flow chart of the invention. The steps of the invention include:

1. Provide a recording program 40, which is stored in the recording media 11 of the computer 10;
2. The recording program 40 is initiated after a record command is made or a command option is chosen by the input unit 12.
3. Convert audio data recorded by a recording device 20 to an audio file. This step is for the purpose of storing audio data received through the microphone and audio card to designated locations in the recording media 11 of the computer 10. The designated locations are, for example, in the memory or hard drive.
4. A link between the audio file and designated information title is created. In this step a hyperlink tag is added to the information title (which could be a sentence or a word) designated by the input unit 12. A user can click the information title to retrieve the audio file to which it is linked.
5. Audio playing steps for activating the audio playing program 50 to open the audio file and play via the audio output device.

Step 2 mentioned above can be performed by inputting a command or selecting from command options. For example, it can be done by pressing a button (like the right or middle button of the mouse) of the computer input device 12. Subsequently, the recording program 40 is initiated. Step 2 can also be performed by clicking an icon displayed on the output device 13 (i.e., a monitor) of the computer. After the icon is clicked, the recording program 40 is initiated.

Figures 3, 4:
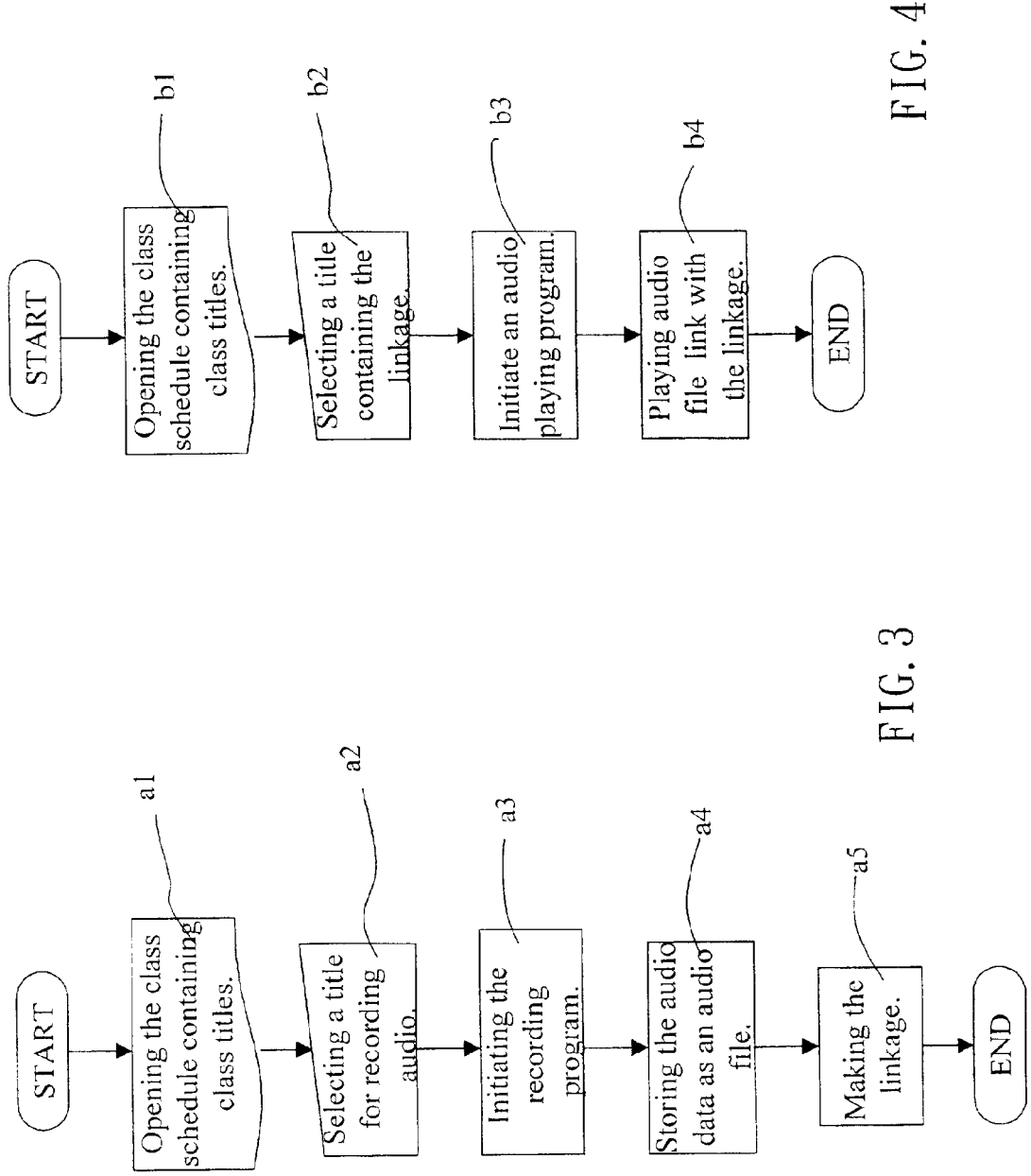
FIG. 3 illustrates the detailed operation flow chart of the invention, showing steps for generating an audio file that will be linked to an information title.
FIG. 4 illustrates the detailed operation flow chart of the invention, showing steps for playing an audio file linked to an information title.

One embodiment of the invention is described as follows (as shown in FIG. 3) For example, a student gets a document about his or her class schedule. This document containing different class titles can be created by the student or obtained via e-mail, and then saved to the recording media 11 of the computer 10. When the student is taking classes, s/he just needs to open the class schedule containing class titles (step a1) and move the cursor to the class title that s/he is currently taking. S/he then presses the right button of the mouse to select the "record" command and to initiate the recording program 40 (step a1–a3). The recording program 40 saves the audio data received through a microphone and audio card as an audio file (step a4) to the recording media 11 of the computer 10 or PDA. The class title is linked to the saved audio file. The link node generated by the preceding processes is then combined with the class schedule by, for example, changing the original color of the class title to a specific color as a mark of linkage (step a5). After everything is done, the student can simply click the link node containing the class title of a specific color to open and listen to the recorded audio data.

FIG. 4 illustrates the flow chart of playing audio files. Open the class schedule (step b1), and move the cursor to a class title linked to an audio file. Click the left button to choose this class title (step b2). Initiate an audio playing program 50 (step b3). The audio playing program 50 opens the corresponding audio file stored in the recording media 11 of the computer or PDA. The audio file is played via the audio output device 30 (step b4).

According to the method of the invention, users can use a computer (PC or laptop) with multimedia functions to record audio data and link the audio data to a given information title. It is not necessary to use an audio tape recorder. The inconvenience caused by searching audio files in storage media (hard drive, memory or CD-ROM) will not occur with the invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of adding audio data to an information title of a document comprises:

providing a recording program, the recording program being stored in a recording media of a computer;

selecting a designated information title from a document stored in a computer or a PDA;

inputting a record command to execute the recording program;

obtaining audio data from the recording program;

converting the audio data to an audio file and storing the audio file to a designated location inside the recording media of the computer; and building a hyperlink tag between the audio file and the designated information title.

2. The method of adding audio data to an information title of a document of claim 1, wherein the recording media is hard drive.

3. The method of adding audio data to an information title of a document of claim 1, wherein the recording media is memory.

4. The method of adding audio data to an information title of a document of claim 1, wherein the record command is processed by pressing a button of an input unit of the computer.

5. The method of adding audio data to an information title of a document of claim 4, wherein the input unit is a mouse.

6. The method of adding audio data to an information title of a document of claim 1, wherein the designated location of the recording media is a path inside a hard drive.

7. The method of adding audio data to an information title of a document of claim 1, wherein the hyperlink tag is text of a specific color.

8. The method of adding audio data to an information title of a document of claim 1, wherein the designated information title is one of a text and a title of a document.

9. The method of adding audio data to an information title of a document of claim 1, further comprising clicking the designated information title to play the audio file.

10. The method of adding audio data to an information title of a document of claim 9, wherein the designated information title is one of a text and a title of a document.

* * * * *